US007917900B2

(12) United States Patent
Rajamani et al.

(10) Patent No.: US 7,917,900 B2
(45) Date of Patent: Mar. 29, 2011

(54) ENABLING ANALYSIS OF SOFTWARE SOURCE CODE

(75) Inventors: Sriram K. Rajamani, Bangalore (IN); Prakash Chandrasekharan, Chennai (IN); Christopher L. Conway, Brooklyn, NY (US); Joseph Joy, Bangalore (IN)

(73) Assignee: Microsoft Corporation, Redmond, WA (US)

( * ) Notice: Subject to any disclaimer, the term of this patent is extended or adjusted under 35 U.S.C. 154(b) by 1003 days.

(21) Appl. No.: 11/693,938

(22) Filed: Mar. 30, 2007

(65) Prior Publication Data

US 2008/0244539 A1 Oct. 2, 2008

(51) Int. Cl.
  *G06F 9/45* (2006.01)
(52) U.S. Cl. ........ 717/152; 718/102; 718/107; 717/136; 717/140; 717/142; 717/146
(58) Field of Classification Search .................. None
  See application file for complete search history.

(56) References Cited

U.S. PATENT DOCUMENTS

| 6,230,114 | B1 * | 5/2001 | Hellestrand et al. | 703/13 |
| 6,343,376 | B1 * | 1/2002 | Saxe et al. | 717/154 |
| 6,353,896 | B1 | 3/2002 | Holzmann et al. | |
| 6,385,765 | B1 | 5/2002 | Cleaveland et al. | |
| 6,684,389 | B1 * | 1/2004 | Tanaka et al. | 717/140 |
| 7,316,005 | B2 * | 1/2008 | Qadeer et al. | 717/131 |
| 7,784,035 | B2 * | 8/2010 | Kahlon et al. | 717/133 |
| 2002/0062463 | A1 * | 5/2002 | Hines | 714/38 |
| 2002/0087953 | A1 * | 7/2002 | Hines | 717/125 |
| 2002/0174415 | A1 * | 11/2002 | Hines | 717/127 |
| 2002/0199173 | A1 * | 12/2002 | Bowen | 717/129 |
| 2003/0028858 | A1 * | 2/2003 | Hines | 717/125 |
| 2003/0121027 | A1 * | 6/2003 | Hines | 717/135 |
| 2003/0191793 | A1 | 10/2003 | Dolin, Jr. et al. | |
| 2005/0010910 | A1 | 1/2005 | Lindhorst et al. | |
| 2005/0102681 | A1 | 5/2005 | Richardson | |
| 2005/0166039 | A1 | 7/2005 | Wang et al. | |
| 2005/0177775 | A1 * | 8/2005 | Qadeer et al. | 714/38 |
| 2006/0036910 | A1 | 2/2006 | Fung et al. | |
| 2006/0123430 | A1 * | 6/2006 | Hunt et al. | 719/319 |
| 2006/0218534 | A1 * | 9/2006 | Kahlon et al. | 717/124 |
| 2007/0011671 | A1 * | 1/2007 | Kahlon et al. | 717/170 |

OTHER PUBLICATIONS

Fischer, Jeffrey et al., "Tasks: Language Support for Event-driven Programming," Proceedings of the ACM SIGPLAN 2007, ACM 2007 (10 pages).
Appel, Andrew W., "An Empirical and Analytic Study of Stack vs. Heap Cost for Languages with Closures," J. Functional Programming 1, Cambridge University Press, Jan. 1993 (27 pages).

(Continued)

*Primary Examiner* — Michael J Yigdall
*Assistant Examiner* — Samuel Hayim
(74) *Attorney, Agent, or Firm* — Perkins Coie LLP

(57) ABSTRACT

A source code clarification system is described. In various embodiments, the source code clarification system receives clarified source code and transforms the clarified source code into standard source code or object code that implements asynchronous components. The standard software source code can contain expressions for enabling asynchronous communications. The clarified code can be software source code that is expressed in an imperative language and is capable of static analysis. The clarified source code can contain a coordination primitive that encapsulates interactions between asynchronous components. By using the coordination primitives and events, the clarified source code can express interactions between asynchronous components so that the clarified source code is easier for developers to understand and for static analysis tools to analyze.

19 Claims, 10 Drawing Sheets

OTHER PUBLICATIONS

Gay, David et al., "The NesC Language: A Holisitic Approach to Networked Embedded Systems," Nov. 2002, Copyright 2002, Intel Corporation (12 pages).

Li, Peng et al., "A Language-Based Approach to Unifying Events and Threads," University of Pennsylvania, 2006.

* cited by examiner

ENABLING ANALYSIS OF SOFTWARE SOURCE CODE

BACKGROUND

Software developers can use various tools to analyze software, such as to identify programming defects. Tools can generally be classified based on whether they perform a "static" analysis on software source code or a "dynamic" analysis on executing software object code. Examples of common programming defects that analysis tools can identify include using memory before it has been allocated or after it has been unallocated, using file handles before a file has been opened or after it has been closed, assigning incorrect value types to variables, and so forth. Various tools are available that perform static analyses by analyzing procedures in software that is written using a standard imperative programming language, such as C, C++, BASIC, Pascal, and Fortran. Software developers can use imperative programming languages to write software that executes in a sequential style, such as software code that flows from one procedure to another. Even when this software has parallel execution paths, such as when the software employs multiple threads, the tools can analyze the execution paths sequentially. Tools that analyze sequentially designed software generally cannot identify defects based on data in a heap because the heap is constructed when the software executes. The heap is an area of memory that executing software can use, such as to store values assigned to variables, class instances, and so forth. However, even dynamic analysis of software cannot identify some types of errors despite being able to analyze the heap. As an example, dynamic analysis cannot identify various defects that occur in software that has asynchronously communicating "layers" or components ("asynchronous components").

When two asynchronous components communicate, a requesting component makes an asynchronous request to a responding component. The responding component can perform a portion of the requested operation and return execution to the requesting component, such as with a status indicating that the operation is pending. One or both components may store various attributes in a heap, such as a count of the number of requests that are pending, the status of each request, and so forth. The responding component may then complete the remainder portion of the requested operation later. When the operation completes, the responding component may invoke a method provided by the requesting component to indicate that the operation is complete.

Software developers generally use an event-driven programming style when designing asynchronous layers. Event-driven programming can provide superior performance as compared to other styles of programming that can be used to design asynchronous layers because synchronous communications between components can be reduced by registering events that other components can handle asynchronously. As an example, a network driver may employ event-driven programming when sending or receiving messages. An application that communicates with a server may invoke a send_message method of the network driver to send a message to the server. The send_message method may determine whether a network interface card is busy sending or receiving other messages. If it is not busy, the send_message method may send the message and return a success indication to the application. However, if the network interface card is busy, the network driver may queue the message for sending later and return a status indication that the message has not yet been sent. An asynchronous component of the network driver may perform the send_message method when that method is invoked by an application or the operating system. Another asynchronous component of the network driver can interact with the network interface card and send messages that are waiting in the queue. As an example, after the asynchronous component that interacts with the network interface card determines that no messages are being sent or received, it can send a message waiting in the queue. Before sending the message, this asynchronous component may need to determine that the message is ready to send. Because several places in the code may modify messages waiting in the queue, a static analysis tool may be unable to determine whether the message is sent after it is ready to send. Thus, software code that is implemented using event-driven programming styles or has asynchronous components can be difficult to analyze because it is nonsequential and asynchronous, and can maintain state information in a heap.

SUMMARY

A source code clarification system is described. The source code clarification system can receive clarified source code and transform the clarified source code into standard source code or object code that implements asynchronous components. The software source code can contain expressions for enabling asynchronous communications. The clarified code can be software source code that is expressed in an imperative language and is capable of static analysis. The clarified source code can contain a coordination primitive that encapsulates interactions between asynchronous components. By using the coordination primitives and events, the clarified source code can express interactions between asynchronous components so that the clarified source code is easier for developers to understand and for static analysis tools to analyze.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
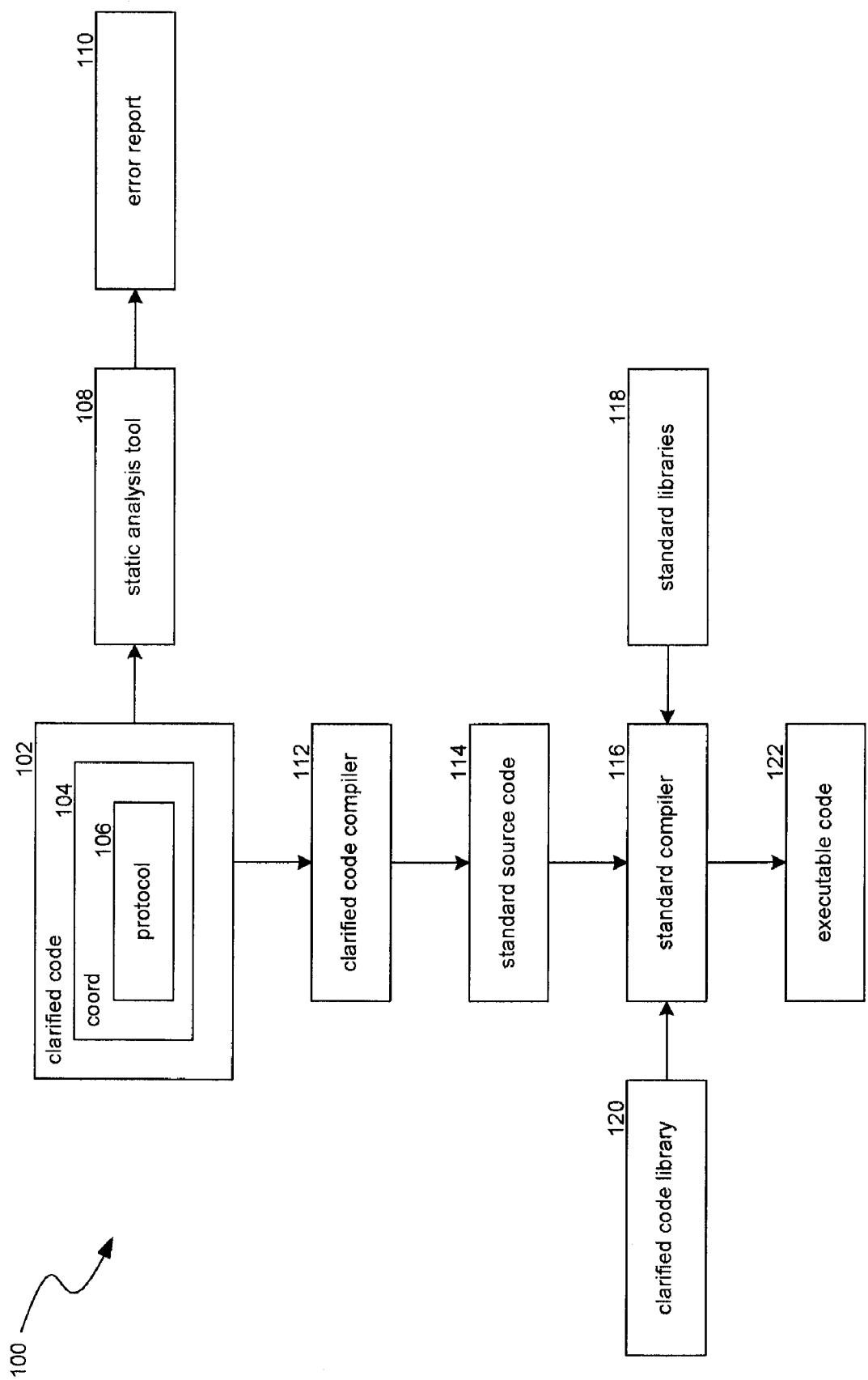
FIG. 1 is a block diagram illustrating components of a source code clarification system and data flows between the components in various embodiments.

A source code clarification system is described. In various embodiments, the source code clarification system receives clarified source code and transforms the clarified source code into standard source code or object code that implements asynchronous components. The clarified code is software source code that is expressed in an imperative language and is capable of static analysis. It can contain expressions for enabling asynchronous communications and a coordination primitive that encapsulates interactions between asynchronous components. A primitive is a data type. By using the coordination primitives and events, the clarified source code can express interactions between asynchronous components in such a manner that the clarified source code is easier for developers to understand and for static analysis tools to analyze. As an example, the interactions can be expressed sequentially.

The coordination primitive can include an expression of a coordination protocol that defines expected coordination between asynchronous components. The coordination protocol can be expressed within a portion of the coordination primitive, such as when declaring the coordination primitive in the classified source code. The source code clarification system can transform the clarified source code into standard source code that is expressed in a standard imperative programming language (e.g., in the C programming language) and that can be compiled to produce object code containing the asynchronous components. Thus, although the produced standard source code may not be fully analyzable by a static analysis tool, asynchronous communications specified in the clarified source code can be analyzed. In some embodiments, the source code clarification system can transform the clarified source code directly into executable code, such as object code or intermediate language code that can be executed by a virtual machine, such as a common language runtime.

In various embodiments, the source code clarification system has asynchronous control features and a coordination primitive data structure. The asynchronous control features are an event abstraction, a send primitive, a send_all primitive, a wait_for primitive, and an async primitive. The event abstraction provides a collection of events relating to threads. The send primitive enables a logical thread to send an event. A logical thread is a thread that an application can create. The source code control system can cause the logical thread to be executed by an actual thread. In various embodiments, the number of actual threads can be specified and can be limited, such as to facilitate analysis. The send_all primitive enables a logical thread to broadcast an event to other threads. The wait_for primitive enables a logical thread to wait for a Boolean combination of conditions and events. The async primitive can start a new asynchronous logical thread.

The coordination primitive data structure has attributes and methods as members. It also has a coordination interface that applications can employ when instantiating the coordination primitive. The coordination primitive can define a coordination protocol as a member. In some embodiments, the coordination protocol can specify how an application can interact with the coordination interface. As an example, when application source code employs the coordination primitive in a manner that is not defined by the coordination protocol, a static analysis tool can identify a defect.

Table 1 provides an example of an instance of a coordination primitive that defines a "gate" protocol. Although a "gate" type of protocol is used as an example herein, the source code clarification system can enable the expression of many asynchronous protocols.

TABLE 1

```
Coord gate
{
    /* Sent when a closed gate is empty. */
    event e;
    /* Invoked by a "client" thread to enter
    * the gate. Returns false if the gate is
    * closed (entry is denied). */
    bool Enter( );
    /* Invoked by a "client" thread to exit
    * the gate. */
    void Exit( );
    /* Invoked by a "control" thread to close
    * the gate. Returns false if the gate is
    * already closed. */
    bool Close( );
    /* Invoked by a "control" thread waiting
    * for the gate to clear. */
    bool IsEmpty( );
    protocol{
        init: Enter( ) && $ret => s1;
        init: Enter( ) && !$ret => done;
        s1: Exit( ) => done;
        init: Close( ) && $ret => s2;
        init: Close( ) && !$ret => done;
        s2: waitfor(IsEmpty( ),e) => done;
        done: Thread.Done( ) => final;
        /* the following transition is implicit
        * init: Thread.Done( ) => final; */
    }
}
```

The coordination primitive illustrated in Table 1 specifies four functions in the coordination interface: Enter( ), Exit( ), Close( ), and IsEmpty( ). An application that employs the interface can employ the Enter and Exit methods to enter or exit the gate, respectively, such as when beginning or ending operations that are controlled by the gate. The application can employ the Close method to prevent new operations from beginning and the IsEmpty method to determine whether pending operations are complete. This coordination primitive has been assigned to a gate variable. This coordination primitive implements a "gate" type of protocol. According to the gate protocol, a send operation enters a gate by invoking an "Enter" method and exits the gate by invoking an "Exit" method before returning. A pause operation closes the gate and waits for the sending operations (e.g., send operations inside the gate) to complete before returning.

The coordination primitive has a coordination protocol section. The coordination protocol section defines coordination between asynchronous components. According to the gate coordination primitive's protocol that is illustrated in Table 1, a component can invoke either the Enter method or the Close method first. This indication is made by the "init" expression. If the Enter method returns a true value, the protocol indicates to invoke the Exit method. If the Close method is invoked first and it returns a true value, the protocol indicates to block (e.g., by invoking a wait_for command) on the IsEmpty method. When invoking the wait_for command, one or more conditions and event identifiers are provided. When a thread blocks on a method, the source code clarification system waits for a condition to be satisfied. In some embodiments, all or some of the conditions may need to be satisfied. The protocol indicates to invoke a Thread.Done method to stop execution of the active thread when (1) the Enter or Close methods do not return a true value, (2) after invoking the Exit method, and (3) after blocking on the IsEmpty method. Using this coordination protocol specification, the source code or object code can be verified, such as to ensure that there are no deadlocks or other programming defects.

The source code clarification system enables static analysis of source code, such as to determine whether the program follows a specified coordination protocol. This analysis can be performed statically using the clarified source code. The source code clarification system also enables verification, such as to determine whether an implementation of a coordination primitive causes deadlocks or other errors. This analysis can be performed dynamically using the object code. Thus, in some embodiments, the source code clarification system enables specification of asynchronous components that can be analyzed to ensure compliance with a coordination protocol that is defined during specification of the asynchronous components.

In some embodiments, the source code clarification system schedules threads cooperatively by assigning logical threads created by an application to a specified set of actual threads. The source code clarification system can assign a protocol obligation (e.g., a function or method that executes a portion of the protocol) to one of the logical threads when the corresponding function or method is invoked asynchronously. Thus, code can be analyzed sequentially more readily.

The source code clarification system will now be described with reference to the figures. FIG. 1 is a block diagram illustrating components of a source code clarification system 100 and data flows between the components in various embodiments. The source code clarification system 100 includes clarified source code 102. Clarified code is source code that includes various programming constructs that the source code clarification system can analyze or transform, such as into standard source code. In some embodiments, the clarified code includes new programming constructs that are added to a conventional programming language, such as an imperative programming language like C. The clarified code 102 can include asynchronous control features and a coordination primitive 104 that encapsulates interactions between asynchronous components. The asynchronous control features include an event abstraction, a send method that enables a thread to send an event, a send_all method that enables a thread to broadcast an event to other threads, a wait_for method that enables a thread to wait for Boolean combinations of conditions and events, and an async method that launches an asynchronous thread. These methods are described in further detail below.

The coordination primitive ("coord") can include a protocol interface 106 that defines acceptable usage of the coordination primitive. A primitive is a fundamental data type that can be combined with other data types to create more complex data types. As an example, integers, characters, and floating-point values are primitives. Although a coord is a primitive in the source code clarification system, it is similar to a class in that it has both attributes and methods as its members. Threads that operate asynchronously employ the protocol defined by the protocol interface 106 of the coord. By employing the protocol, the source code clarification system can verify inter-operation correctness and intra-operation correctness separately.

The source code clarification system can also include a static analysis tool 108 that produces an error report 110. The static analysis tool can analyze clarified code statically to detect and identify programming defects, such as programming defects caused by improperly using the new programming constructs introduced by the clarified code or not implementing communications in the manner the coordination protocol defines.

A clarified code compiler 112 can compile ("transform") the clarified code into standard source code 114, such as source code expressed in the C programming language. A standard compiler 116 can compile the standard source code 114 into executable code 122. When producing the executable code 122, the standard compiler may employ standard libraries 118, a clarified code library 120, or both. The clarified code library may provide utility functions or other methods that the new programming constructs expressed in the clarified code may employ.

The computing devices on which the source code clarification system operates may include one or more central processing units, memory, input devices (e.g., keyboard and pointing devices), output devices (e.g., display devices), storage devices (e.g., disk drives), and network devices (e.g., network interfaces). The memory and storage devices are computer-readable media that may store instructions that implement the source code clarification system. In addition, the data structures and message structures may be stored or transmitted via a data transmission medium, such as a signal on a communications link. Various communications links may be employed, such as the Internet, a local area network, a wide area network, or a point-to-point dial-up connection.

The source code clarification system may use various computing systems or devices including personal computers, server computers, hand-held or laptop devices, multiprocessor systems, microprocessor-based systems, programmable consumer electronics, electronic game consoles, network PCs, minicomputers, mainframe computers, distributed computing environments that include any of the above systems or devices, and the like. The source code clarification system may also provide its services to various computing systems, such as personal computers, cell phones, personal digital assistants, consumer electronics, home automation devices, and so on.

The source code clarification system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2A:
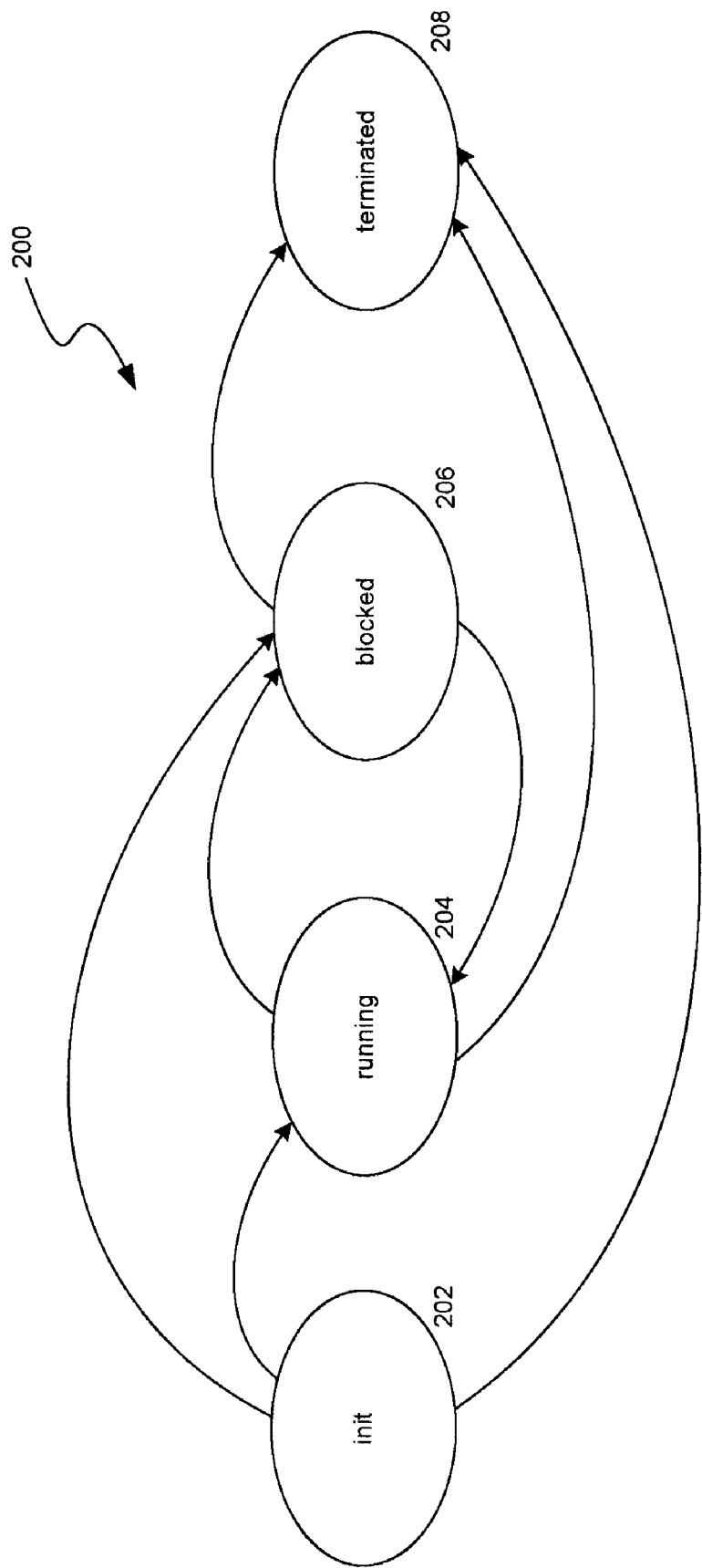
FIG. 2A is a state diagram illustrating states of threads in the source code clarification system and transitions between the states in some embodiments.

FIG. 2A is a state diagram 200 illustrating states of threads in the source code clarification system and transitions between the states in some embodiments. The state diagram 200 illustrates four states: an initialized state 202, a running state 204, a blocked state 206, and a terminated state 208. The source code clarification system may cause a thread to begin in the initialized state 202. A thread in the initialized state may move to a running state 204 or may move to one of the other states. A thread that is in the running state 204 may move to a blocked state 206 or a terminated state 208. As an example, a running thread 204 may move to the blocked state 206 when it invokes a blocking function, such as when sending a message when the network interface card is being used. A thread that is blocked may move to the running state 204 or to the terminated state 208. Once a thread moves to the terminated state, the source code clarification system may employ that thread for other processing.

Figure 2B:
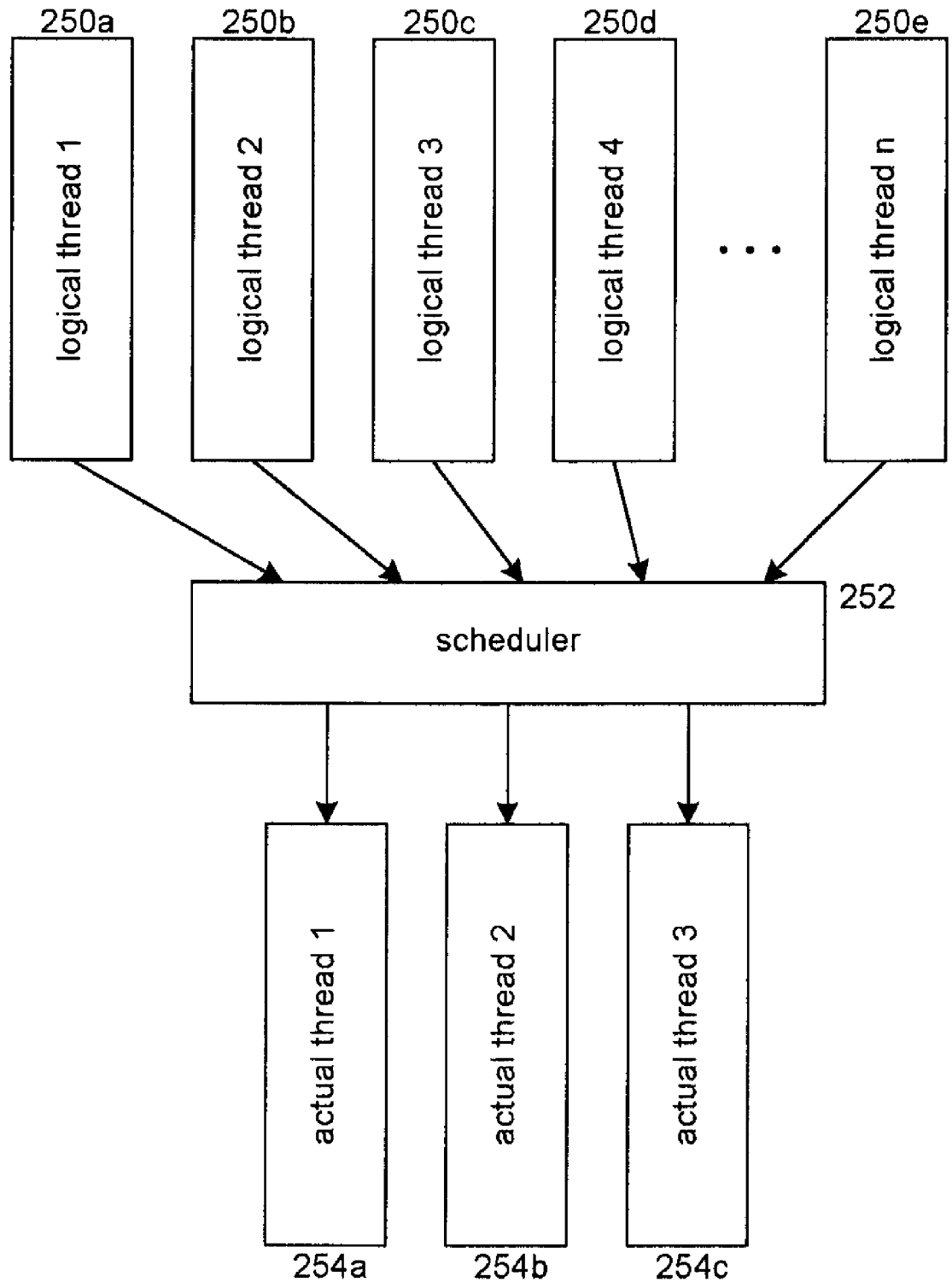
FIG. 2B is a block diagram illustrating thread scheduling by the source code clarification system in some embodiments.

FIG. 2B is a block diagram illustrating thread scheduling by the source code clarification system in some embodiments. The source code clarification system can have a set of actual threads 254a, 254b, and 254c. Although three actual threads are illustrated, the source code clarification system can have additional or fewer actual threads. A scheduler component 252 schedules the actual threads. As an example, the scheduler component can select one or more logical threads 250a, 250b, 250c, 250d, and 250e for scheduling. When a logical thread is scheduled, it can execute within the actual thread. Although five logical threads are illustrated, there may be more or fewer logical threads.

Figure 3:
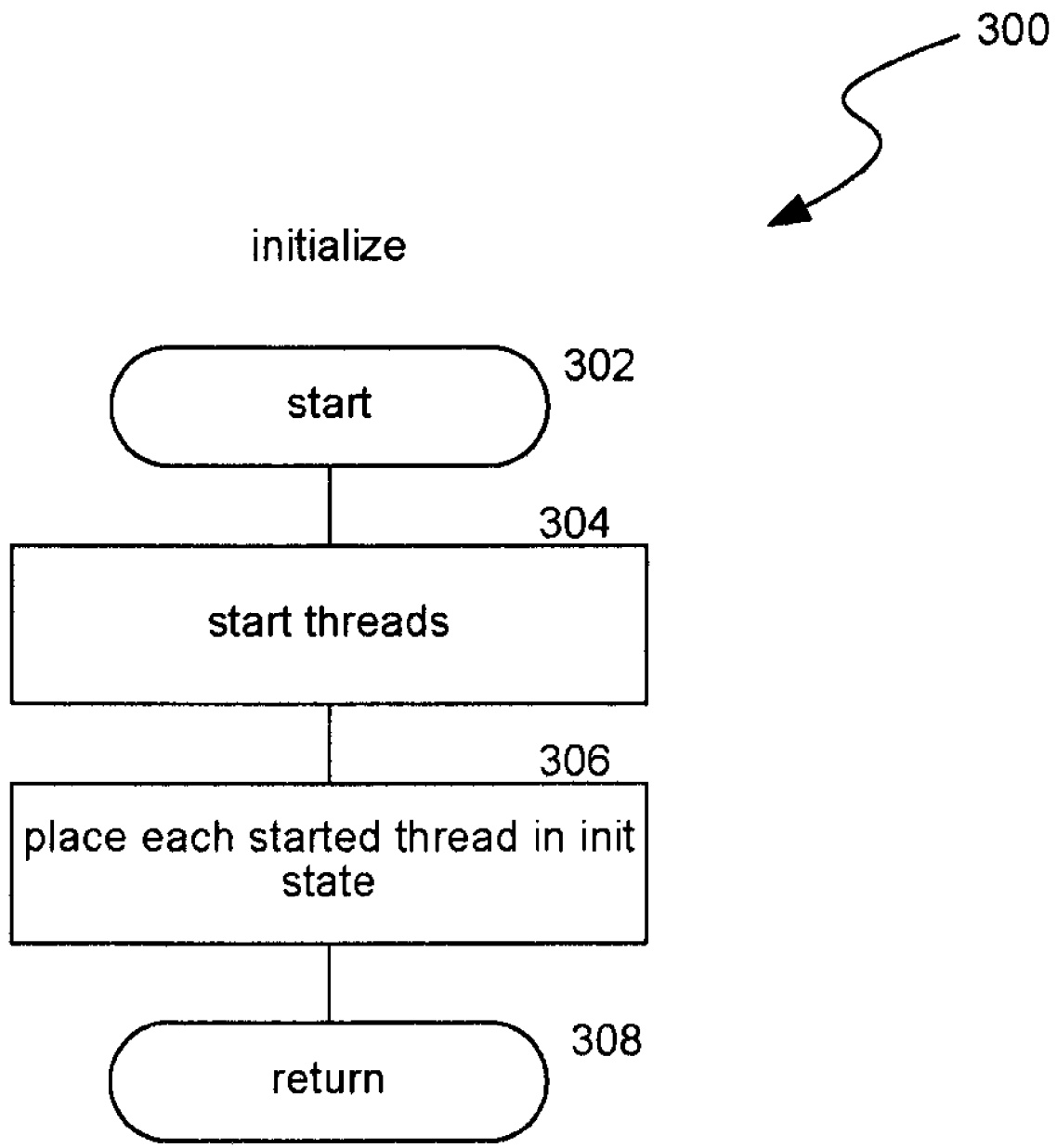
FIG. 3 is a flow diagram illustrating an initialize routine invoked by the source code clarification system in some embodiments.

FIG. 3 is a flow diagram illustrating an initialized routine 300 invoked by the source code clarification system in some embodiments. The source code clarification system may invoke the initialized routine 300 when initializing the system or the threads. The routine begins at block 302. At block 304, the routine starts threads. As an example, the source code clarification system may employ a specified number of actual threads. One or more logical threads may each be assigned to the actual threads. When processing of one of the actual threads is blocked, the source code clarification system may assign a different logical thread to the actual thread that the blocked logical thread was previously employing. At block 306, the source code clarification system places each started thread in an initialized state. The routine returns at block 308. When a thread is in the initialized or blocked states, the thread's continuation attribute specifies the code that needs to be run when the thread moves to this running state. When the thread moves to the running state, a waitevent attribute is assigned the identifier of the conjunct that is satisfied. The conjunct can be specified when a blocking function is invoked, as is described in further detail below.

Those skilled in the art will appreciate that the logic illustrated in FIG. 3 and described above, and in each of the flow diagrams discussed below, may be altered in a variety of ways. For example, the order of the logic may be rearranged, substeps may be performed in parallel, illustrated logic may be omitted, other logic may be included, etc.

Figure 4:
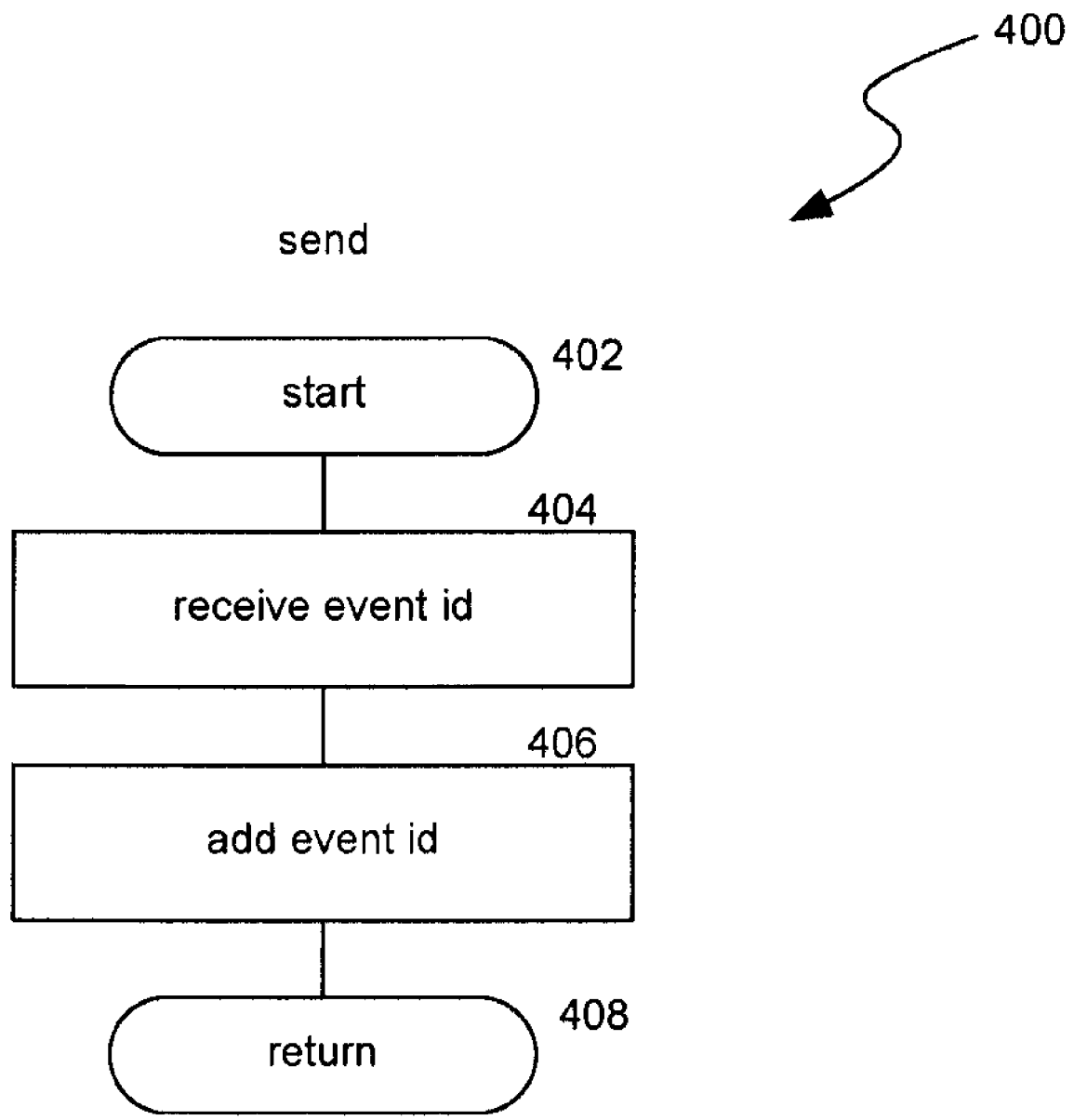
FIG. 4 is a flow diagram illustrating a send routine invoked by the source code clarification system in some embodiments.

FIG. 4 is a flow diagram illustrating a send routine 400 invoked by the source code clarification system in some embodiments. The send routine 400 enables a logical thread to send an event. When a thread is in a blocked state, it waits on a set of blocking conjuncts. The send routine 400 begins at block 402. At block 404, the routine receives an event identifier. At block 406, the routine adds the received event identifier to a set of events that the source code clarification system stores. At block 408, the routine returns.

Figure 5:
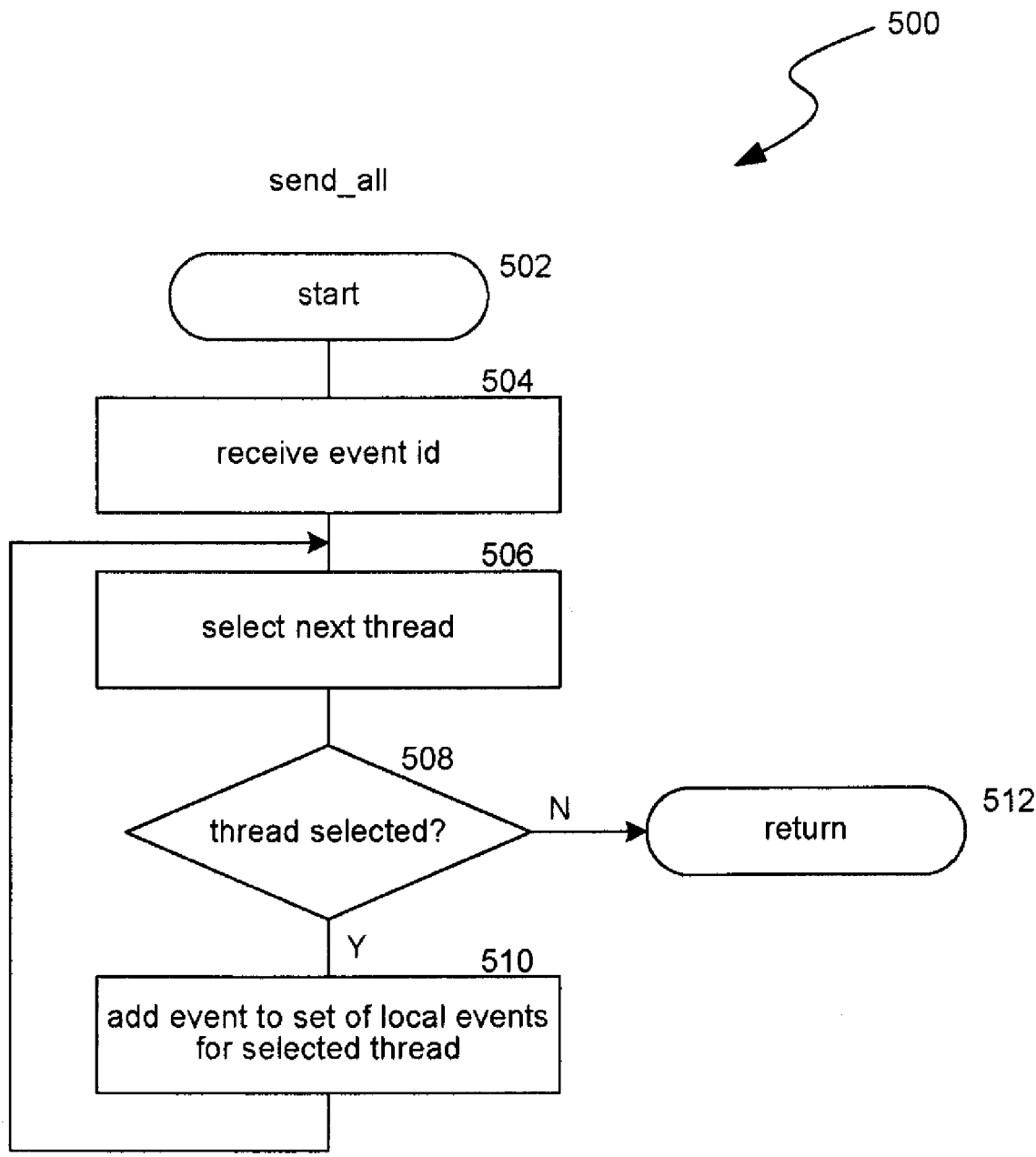
FIG. 5 is a flow diagram illustrating a send_all routine invoked by the source code clarification system in some embodiments.

FIG. 5 is a flow diagram illustrating a send_all routine 500 invoked by the source code clarification system in some embodiments. The send_all routine adds an event identification to a set of events that each thread maintains as part of that thread's state. The routine 500 begins at block 502. At block 504, the routine receives an event identifier. At block 506, the routine selects the next thread. If no thread can be selected, e.g., because all threads have been processed, the routine may be unable to select another thread. At decision block 508, the routine determines whether a thread was selected at block 506. If no thread could be selected, the routine returns at block 512. Otherwise, when a thread was selected the routine continues at block 510. At block 510, the routine adds the received event identifier to the set of local events that the selected thread maintains. The routine then continues at block 506.

In various embodiments, the send and send_all routines may employ multisets to store events. In such a case, if an event is sent multiple times before it is handled, duplicate events can be ignored and not added to the multisets.

Figure 6:
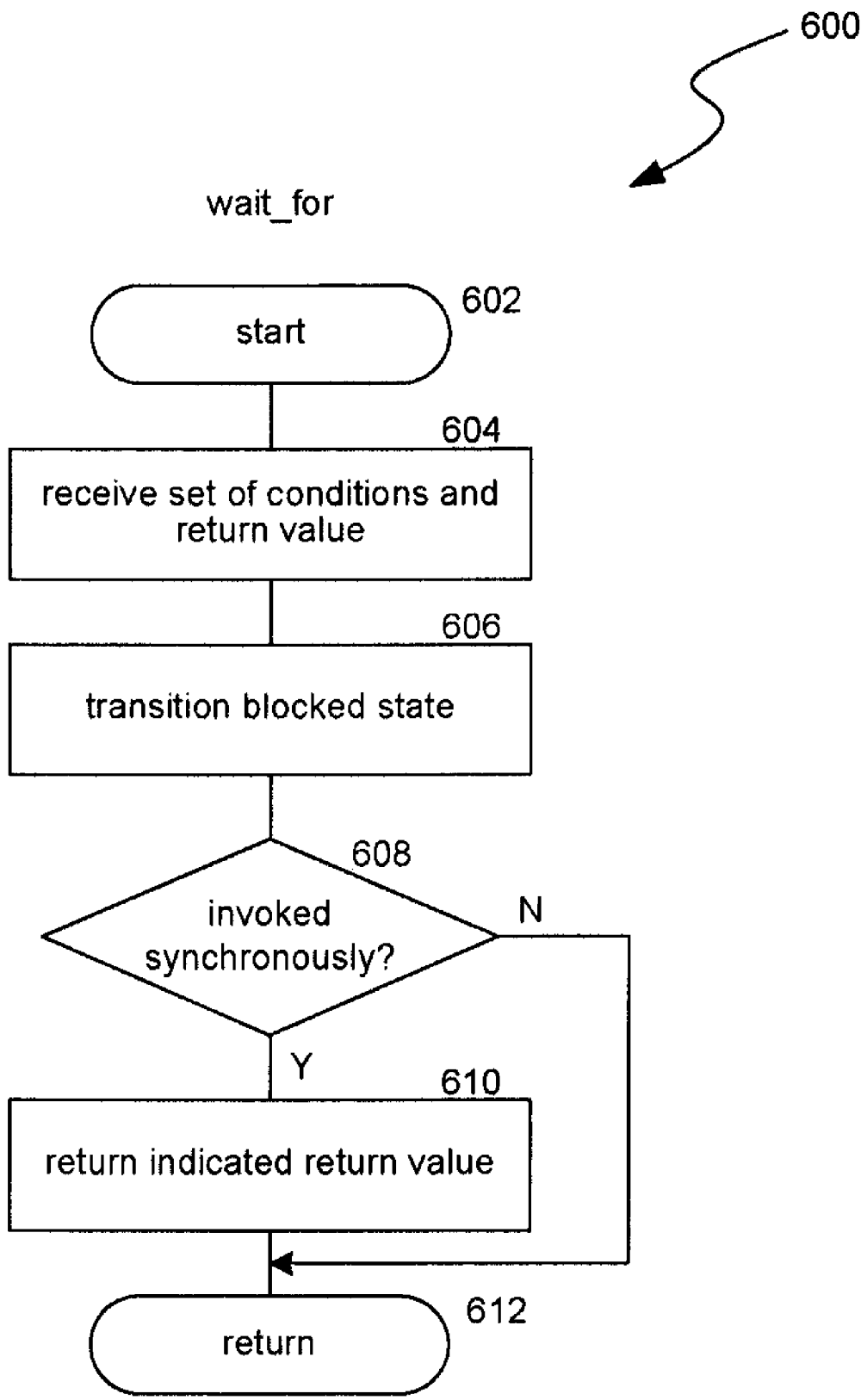
FIG. 6 is a flow diagram illustrating a wait_for routine invoked by the source code clarification system in some embodiments.

FIG. 6 is a flow diagram illustrating a wait_for routine 600 invoked by the source code clarification system in some embodiments. Invoking the wait_for routine causes a thread to move to a blocked state. Execution of the thread halts until the thread is scheduled, at which point execution of the thread continues at the statement following the statement that invoked the wait_for routine. The routine 600 begins at block 602. At block 604, the routine receives a set of conditions (e.g., a conjunct) and a return value. The source code clarification system can restart a stopped thread when one or more of the conditions are true. In some embodiments, all conditions may need to be true before the thread restarts. The return value may be used when the routine is invoked synchronously, such as by the operating system. At block 606, the routine transitions the thread to the blocked state. At decision block 608, the routine determines whether it was invoked synchronously. If it was invoked synchronously, the routine continues at block 610. Otherwise, the routine returns at block 612. At block 610, the routine returns the indicated return value. The routine then returns at block 612.

In some embodiments, the wait_for routine receives a list of conjuncts. Each conjunct can be associated with a predicate of conditions and a set of events and tagged with an identifier. The source code control system or an application can employ the identifier to determine which conditions were satisfied. The wait_for routine can receive a return value argument as an expression that can be employed as the return value if the routine blocks.

Figure 7:
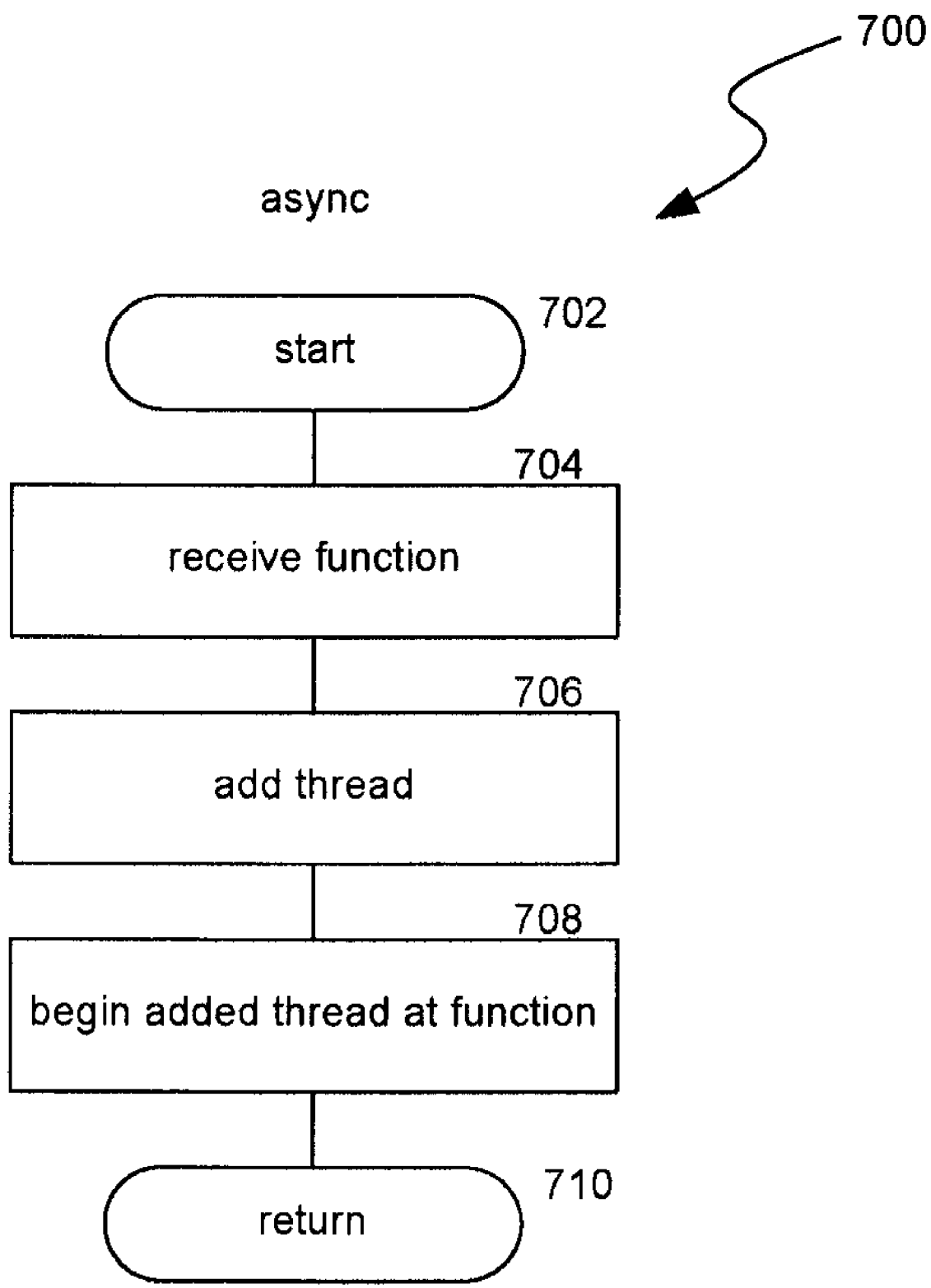
FIG. 7 is a flow diagram illustrating an async routine invoked by the source code clarification system in some embodiments.

FIG. 7 is a flow diagram illustrating an async routine 700 invoked by the source code clarification system in some embodiments. The async routine adds a new thread, such as a logical thread. The routine 700 begins at block 702. At block 704, the routine receives an indication of a function. At block 706, the routine adds a thread. As an example, the routine adds a new logical thread. At block 708, the routine begins execution of the function within the newly added thread. The routine returns at block 710. In some embodiments, the async routine may receive an indication of one or more coordination protocols. The coordination protocols can be provided to the threads the routine starts.

Figure 8:
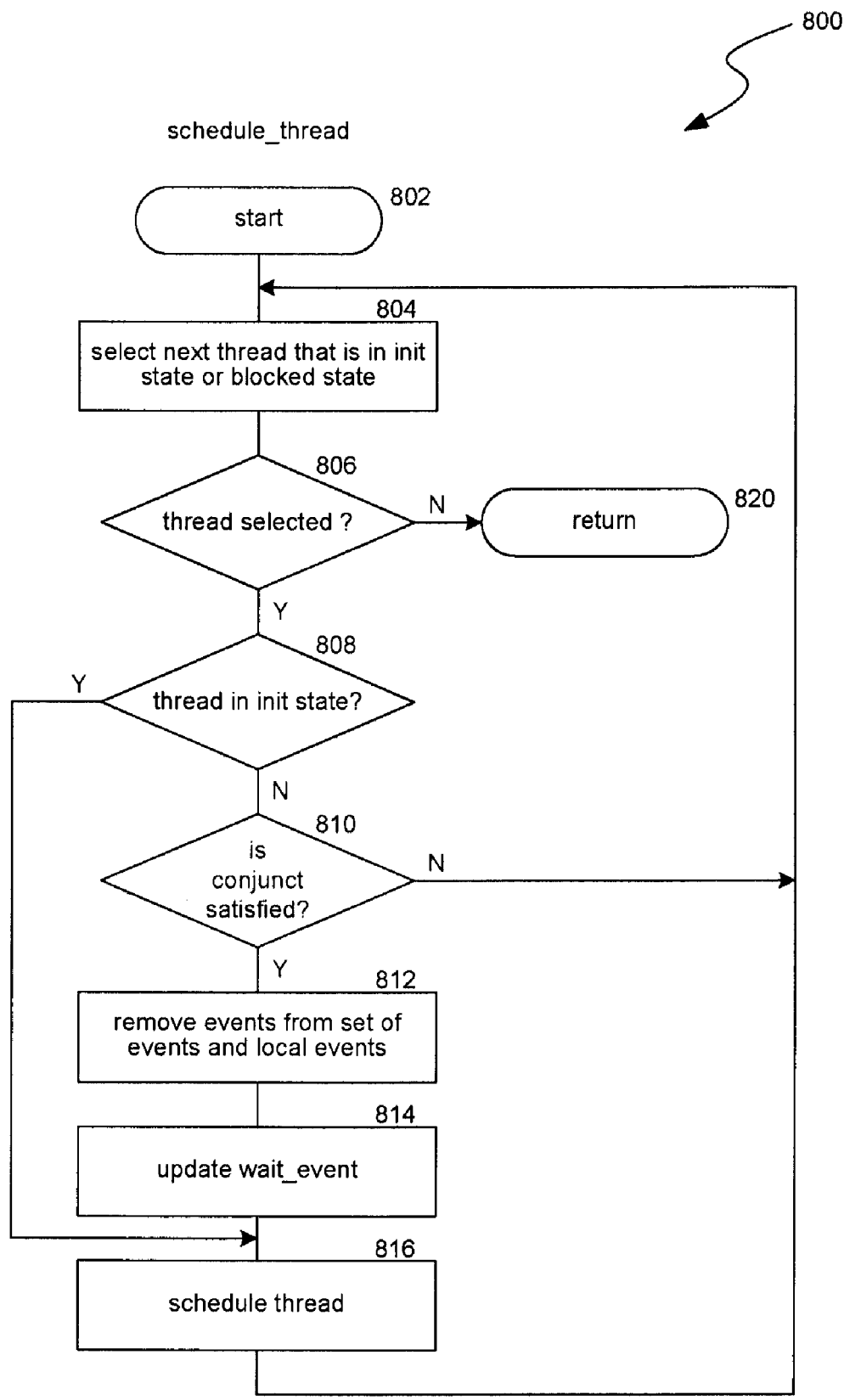
FIG. 8 is a flow diagram illustrating a schedule_thread routine invoked by the source code clarification system in some embodiments.

FIG. 8 is a flow diagram illustrating a schedule_thread routine 800 invoked by the source code clarification system in some embodiments. A scheduler component of the source code clarification system can employ the routine when scheduling a logical thread. The routine 800 begins at block 802. At block 804, the routine selects the next thread that is in the initialized or blocked state. At decision block 806, the routine determines whether a thread was selected. If no threads are in the initialized or blocked state, no thread may be selected at block 804. In such a case, the routine returns at block 820, until such a time as another thread is waiting to be processed. If a thread was selected, the routine continues at decision block 808. At decision block 808, the routine determines whether the selected thread is in an initialized state. If that is the case, the routine continues at block 816. Otherwise, the routine continues at decision block 810 because the thread is in the blocked state. If the blocked thread has one or more of its conjuncts that are satisfied, the routine continues at block 812. Otherwise, the routine continues at block 804. In various embodiments, a thread's conjunct is satisfied when one, multiple, or all conditions associated with the conjunct are satisfied. In some embodiments, the source code clarification system may determine that a conjunct is satisfied when its predicate attribute is true and each event associated with the conjuncts is either (1) in the set of events that the source code clarification system has added or (2) in the local events associated with a thread. At block 812, the routine removes events associated with the satisfied conjuncts from the set of events associated with the source code clarification system and the local events associated with each thread. At block 814, the routine updates a wait_event attribute associated with the thread that is about to be scheduled. At block 816, the routine schedules the thread. As an example, the routine causes the thread to begin executing. The routine then continues at block 804.

Figure 9:
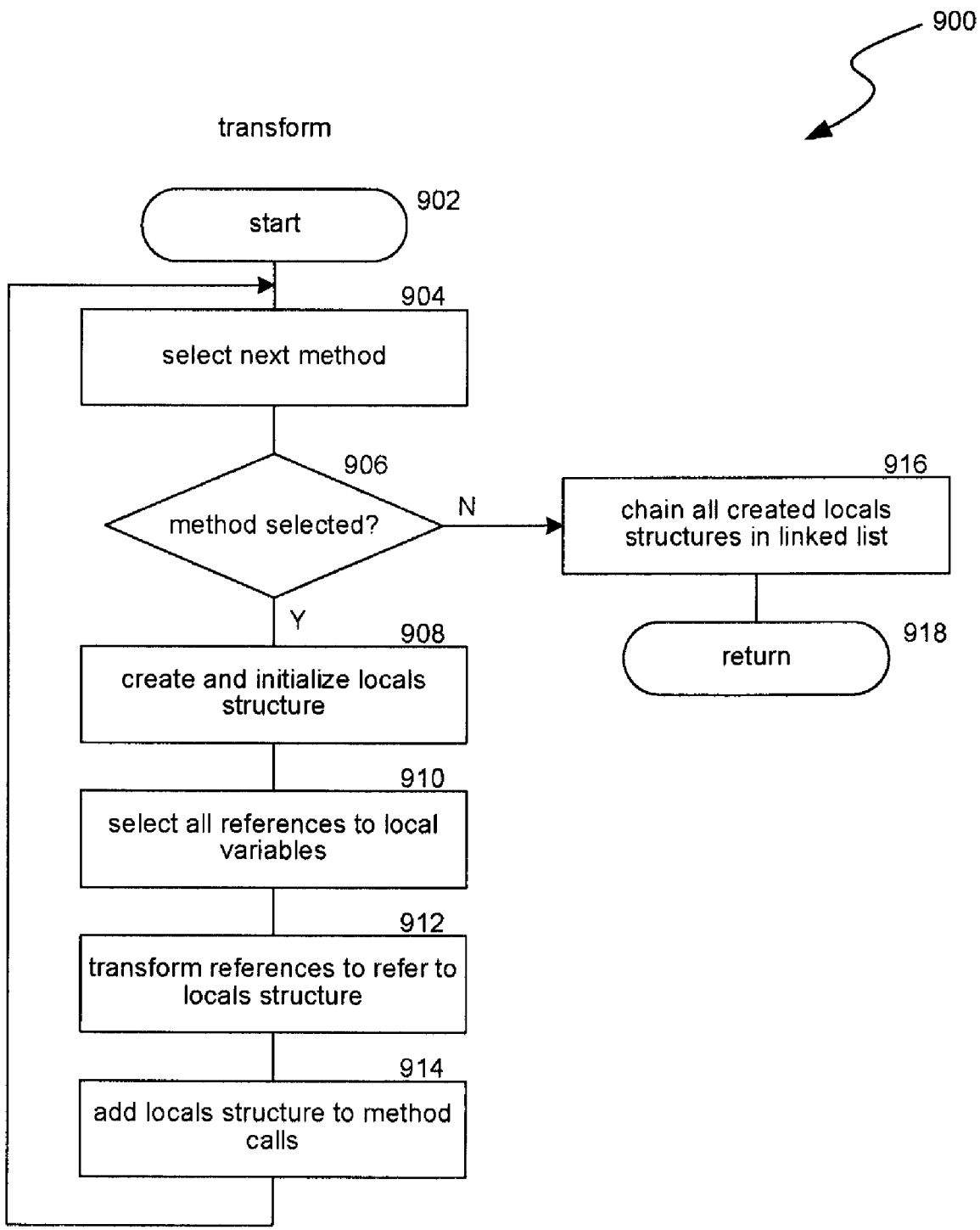
FIG. 9 is a flow diagram illustrating a transform routine invoked by the source code clarification system in some embodiments.

FIG. 9 is a flow diagram illustrating a transform routine 900 invoked by the source code clarification system in some embodiments. The routine 900 can be invoked to transform clarified code into standard source code. The routine begins at block 902. At block 904, the routine selects the next method in the clarified code. At block 906, the routine determines whether a method was selected. If all methods have already been processed, no method may be selectable. If no method was selected, the routine continues at block 916. Otherwise, the routine continues at block 908. At block 908, the routine creates and initializes a locals structure to store data stored in variables. At block 910, the routine selects all references to local variables in the clarified code. At block 912, the routine transforms the references to refer to a "locals" structure. The locals structure stores information pertaining to locals variables that the methods to be transformed employ. At block 914, the routine adds the locals structure to the method invocations. The routine then continues at block 904. At block 916, the routine chains all created locals structures in a linked list. The routine returns at block 918.

The source code clarification system can transform async send (x1, x2, . . . xm)@c1, c2, . . . cn to the code segment illustrated in Table 2.

TABLE 2

```
1:  if * then
2:      if (curfsm ≠ null) and (curfsm ≠ ci) for all i then
3:          curfsm.state = init;
4:      end if
5:      send(x1, x2, . . . , xm);
6:      Thread.Done( );
7:      assume (false);
8:  else
9:      if (curfsm = ci) for any i then
10:         curfsm.state = init;
11:     end if
12: end if
```

The @c1, c2, . . . cn in the async invocation are annotations that assist in static analysis. After the invocation of the send method, the Thread.Done and assume methods can cause the analysis to stop. The analysis assumes that the send method invocation did not return. In the transformed code segment, "if *" represents a condition that cannot be satisfied statically.

The source code clarification system can move local variables into the heap when a blocking function makes a blocking call. The source code clarification system can transform each blocking function to declare a locals structure that contains its local variables. All references to local variables can be transformed to refer to the locals structure instead. Each blocking call can be augmented with a locals parameter, and the multiple locals structures can be linked to create a list. When a thread blocks, a pointer to the current locals structure can be saved to a queue. The source code clarification system can also augment each blocking call with a continuation parameter that represents the next statement that is to be executed when control returns from the call. This continuation parameter can become a part of the local environment for the blocking function. The source code clarification system can split the blocking function at each blocking call. As an example, when blocking function f( ) makes a blocking call to g, it can be split into statements until the blocking call and then statements after the blocking call:

f( ) {A; g( ); B;} is transformed to:

f0( ) {A; g( );} f1( ) {B;}

When the blocking function returns, the source code clarification system transforms the return statement to invoke a continuation on the caller's locals structure. The source code clarification system can apply this transformation recursively to each blocking call in a blocking function. These transformations enable a threaded execution model to be transformed into event-driven code, thereby enabling a blocked thread to be resumed by simply invoking a continuation.

Various tools can be employed with the source code clarification system. A sequential analysis tool, such as SLAM, can be employed to perform a sequential analysis on the clarified source code ("clarified code"). Such a tool can be employed to determine whether the clarified code is consistent with the specified coordination protocol. A tool similar to SPIN can be employed to determine whether the implementation of the coordination primitive by the application is correct.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by a computer system for enabling static analysis of software source code, comprising:

receiving clarified source code, the clarified source code containing a coordination primitive that encapsulates interactions between at least two asynchronous components, the coordination primitive having a coordination interface and including an expression of a coordination protocol that defines coordination between the two asynchronous components, the coordination protocol expressed by a portion of the coordination primitive;

transforming the received clarified source code into standard source code wherein the standard source code is expressed in an imperative programming language and the coordination primitive is not part of the imperative programming language wherein the standard source code can be compiled to produce object code containing the at least two asynchronous components, one of the two asynchronous components for communicating with the other asynchronous component asynchronously, and wherein the clarified source code is analyzable by a static analysis tool to model interactions between at least two asynchronous components but the generated standard source code is not analyzable by the static analysis tool to model the interactions.

2. The method of claim 1 further comprising statically analyzing the clarified source code to determine whether it complies with the coordination protocol.

3. The method of claim 1 wherein the coordination protocol defines correct usage of the coordination interface.

4. The method of claim 1 wherein the transforming includes creating and initializing a locals structure on a heap, the locals structure for storing values assigned to variables when execution of a thread is suspended and transforming variable references to references to the locals structure.

5. The method of claim 4 further comprising chaining a set of locals structures to create a list of locals structures.

6. The method of claim 1 wherein the coordination protocol specifies an order in which methods of the coordination interface can be invoked.

7. A computer-readable medium storing computer-executable instructions that, when executed, perform a method for enabling static analysis of software source code, the method comprising:

receiving clarified source code, the clarified source code containing a coordination primitive that encapsulates interactions between at least two asynchronous components, the coordination primitive having a coordination interface and including an expression of a coordination protocol that defines coordination between the two asynchronous components, the coordination protocol expressed by a portion of the coordination primitive;

transforming the received clarified source code to produce standard source code expressed in a standard programming language and wherein the coordination primitive is not part of the standard programming language, and transforming the standard source code to produce object code containing the at least two asynchronous components, one of the two asynchronous components for communicating with the other asynchronous component asynchronously, and wherein the clarified source code is analyzable by a static analysis tool to model interactions between the two asynchronous components.

8. The computer-readable medium of claim 6 wherein the method further comprises performing a dynamic analysis on the produced object code to determine whether the object code contains a deadlock.

9. The computer-readable medium of claim 6 wherein the object code is code that is expressed in an intermediate language that can be executed by a virtual machine.

10. A system for enabling static analysis of software source code, comprising:

a processor and a memory;

a clarified source code that contains a coordination primitive that encapsulates interactions between at least two asynchronous components, the coordination primitive having a coordination interface and including an expression of a coordination protocol that defines coordination between the two asynchronous components;

a clarified code compiler that compiles the clarified source code to produce an output, wherein the output is standard source code expressed in a standard programming language and wherein the coordination primitive is not part of the standard programming language;

and wherein the clarified source code can be analyzed by a static analysis tool to model interactions between the two asynchronous components but the output cannot be analyzed to model the interactions between the two asynchronous components.

11. The system of claim 10 further comprising a standard compiler wherein the output is standard source code and the standard compiler compiles the standard source code into executable code.

12. The system of claim 11 further comprising a clarified code library wherein the standard compiler employs methods defined in the clarified code library, the methods corresponding to methods expressed in the clarified source code.

13. The system of claim 10 wherein the standard programming language is C.

14. The system of claim 10 further comprising a specified set of actual threads and a created set of logical threads wherein a count of the set of logical threads exceeds a count of the set of actual threads.

15. The system of claim 14 wherein a thread from the set of logical threads is created by an application that implements a method specified in the coordination interface.

16. The system of claim 14 wherein a scheduler component schedules a logical thread for execution within an actual thread.

17. The system of claim 16 wherein the logical thread that the scheduler component schedules is initialized or is blocked and has a satisfied conjunct wherein the conjunct specifies at least a condition.

18. The system of claim 16 wherein the logical thread that the scheduler component schedules is initialized or is blocked and has a satisfied conjunct wherein the conjunct specifies at least an event that has occurred.

19. The system of claim 10 further comprising a static analysis tool that verifies that an application expressed using the clarified source code correctly implements the coordination protocol.

* * * * *